United States Patent
Knöpfle et al.

(10) Patent No.: US 10,792,986 B2
(45) Date of Patent: Oct. 6, 2020

(54) ARRANGEMENT WITH A COVER FOR A VEHICLE ROOF

(71) Applicant: WEBASTO SE, Stockdorf (DE)

(72) Inventors: Julian Knöpfle, Stockdorf (DE); Sebastian Gering, Stockdorf (DE)

(73) Assignee: WEBASTO SE, Stockdorf (DE)

(*) Notice: Subject to any disclaimer, the term of this patent is extended or adjusted under 35 U.S.C. 154(b) by 171 days.

(21) Appl. No.: 16/071,166

(22) PCT Filed: Feb. 7, 2018

(86) PCT No.: PCT/EP2018/053077
§ 371 (c)(1),
(2) Date: Jul. 19, 2018

(87) PCT Pub. No.: WO2018/177635
PCT Pub. Date: Oct. 4, 2018

(65) Prior Publication Data
US 2020/0130484 A1    Apr. 30, 2020

(30) Foreign Application Priority Data
Mar. 27, 2017 (DE) .......... 10 2017 106 510

(51) Int. Cl.
*B60J 7/043* (2006.01)
*B60J 7/02* (2006.01)

(52) U.S. Cl.
CPC .......... *B60J 7/0435* (2013.01); *B60J 7/024* (2013.01)

(58) Field of Classification Search
CPC ................ B60J 7/0435; B60J 7/024
(Continued)

(56) References Cited

U.S. PATENT DOCUMENTS 4,609,222 A * 9/1986 Boots .................. B60J 7/11
296/216.02
4,643,478 A 2/1987 Boots
(Continued)

FOREIGN PATENT DOCUMENTS

CN 204263903 U 4/2015
CN 104626947 A 5/2015
(Continued)

OTHER PUBLICATIONS

First Office Action for corresponding Chinese Patent Application No. 201880000888.5.

*Primary Examiner* — Dennis H Pedder
(74) *Attorney, Agent, or Firm* — Fitch, Even, Tabin & Flannery, LLP (57) ABSTRACT

An arrangement with a cover for a vehicle roof is disclosed having a guide rail which extends along a vehicle longitudinal direction (X), a raising rod which is displaceable along the vehicle longitudinal direction (x) relative to the guide rail, a rear raising lever with respect to the vehicle longitudinal direction (X), which is coupled pivotably to the cover, and which—is guided with a first guide element in a first slotted link which is fixed in position with respect to the guide rail, is guided with a second guide element in a second slotted link which is fixed in position with respect to the guide rail, is guided with a third guide element in a third slotted link which is fixed in position with respect to the guide rail, and is coupled to the raising rod by means of a rotary bearing.

13 Claims, 5 Drawing Sheets

(58) Field of Classification Search
USPC .................................. 296/216.02–216.05
See application file for complete search history.

(56) References Cited

U.S. PATENT DOCUMENTS

| | | |
|---|---|---|
| 4,893,869 A | 1/1990 | Fuerst |
| 4,995,665 A | 2/1991 | Ichinose et al. |
| 9,272,608 B2 | 3/2016 | Sawada et al. |
| 9,278,609 B2 | 3/2016 | Sawada et al. |
| 9,302,571 B2 | 4/2016 | Katsura et al. |
| 9,902,244 B2 | 2/2018 | Hoelzel |
| 2009/0160223 A1 | 6/2009 | Grimm et al. |
| 2017/0267077 A1 | 9/2017 | Hölzel |

FOREIGN PATENT DOCUMENTS

| | | |
|---|---|---|
| CN | 104875585 A | 9/2015 |
| CN | 106457986 A | 2/2017 |
| DE | 3735686 C1 | 12/1988 |
| DE | 4006160 A1 | 8/1990 |
| DE | 10116620 C1 | 11/2002 |
| DE | 102007061091 A1 | 6/2009 |
| DE | 202010012974 U1 | 2/2012 |
| DE | 102012106545 A1 | 1/2014 |
| DE | 102014109698 B3 | 10/2015 |
| JP | 62-286830 A | 12/1987 |
| JP | 05-024438 A | 2/1993 |
| JP | 07-032888 A | 2/1995 |
| JP | 2017-515732 A | 6/2017 |

\* cited by examiner

ARRANGEMENT WITH A COVER FOR A VEHICLE ROOF

CROSS-REFERENCE TO RELATED APPLICATIONS

This application is a U.S. national phase application filed under 35 U.S.C. § 371 of International Application No. PCT/EP2018/053077, filed Feb. 07, 2018, designating the United States, which claims priority from German Patent Application 102017106510.5, filed Mar. 27, 2017, which are hereby incorporated herein by reference in their entirety for all purposes.

DESCRIPTION

Arrangement with a cover for a vehicle roof.

FIELD

The invention relates to an arrangement with a cover for a vehicle roof, in particular an arrangement for what is referred to as a spoiler roof.

BACKGROUND

Arrangements of this type with a cover for a vehicle roof serve, for example, to raise the cover first of all in its rear region from a closed position for closing a roof opening by a raising mechanism for opening purposes and then to displace said cover rearward into an open position.

It is desirable to specify an arrangement with a cover for a vehicle roof, which permits a simple and safe design.

SUMMARY

According to one embodiment of the invention, an arrangement has the cover for the vehicle roof. The arrangement has a guide rail. The guide rail extends along a vehicle longitudinal direction. The arrangement has a raising rod. The raising rod is displaceable along the vehicle longitudinal direction relative to the guide rail. The arrangement has a rear raising lever with respect to the vehicle longitudinal direction. The rear raising lever is coupled pivotably to the cover. The raising lever is guided with a first guide element in a first slotted link which is fixed in position with respect to the guide rail. The raising lever is guided with a second guide element in a second slotted link which is fixed in position with respect to the guide rail. The raising lever is guided with a third guide element in a third slotted link which is fixed in position with respect to the guide rail. The raising lever is coupled to the raising rod. The raising rod and the raising lever are coupled to each other by means of a rotary bearing.

The connection between the raising lever and the raising rod by means of the guide elements and the respective slotted links makes it possible to avoid a sudden change in load on the cover triggered by pressure which is present, for example, by means of the seal on the cover or by external influences, for example a wind load. The change in load is also caused, for example, by means of a prestress on the cover. The prestress of the cover in the Z direction (vertical) is dissipated in a controlled manner when the cover is opened. Impact noises which are caused by the change in load can thus be reduced. Noise emissions are therefore reduced.

The prestress in the Z direction can customarily lead to an abrupt jumping of the raising lever, as a result of which a pulse is transmitted to the raising rod. The raising rod may also be referred to as an actuating lever. This can cause an audible noise.

In particular, because of the connection of the raising rod by means of the rotary bearing to the raising lever and to the first guide element, which is guided in the first slotted link, the sudden change in load is very substantially prevented according to the application. It is therefore also possible to dispense with customarily provided additional elements, such as rubber brakes. In order firstly to be able to compensate for Z tolerances at the cover rear edge and to configure the slope of the first slotted link to be sufficiently flat with the same cable length, the raising lever is guided with the third guide element in the third slotted link and is therefore displaceable relative to the guide rail.

In particular, during the opening and closing of the cover, the first guide element is temporarily guided in the first slotted link and temporarily arranged outside the slotted link. Starting from the closed position of the cover, the first guide element is first of all guided in the first slotted link and leaves the first slotted link after the raising lever has been at least partially pivoted.

During the pivoting of the raising lever relative to the guide rail about an axis of rotation which is defined by the third guide element, the raising lever is additionally displaced along the vehicle longitudinal direction relative to the guide rail. The axis of rotation of the raising lever, which axis of rotation is defined by the third guide element, is displaced relative to the guide rail during the pivoting of the raising lever relative to the guide rail.

According to embodiments, the first slotted link has a profile in which a distance between the first slotted link and a base of the guide rail increases rearward in the vehicle longitudinal direction in a section. A gently raising slotted link is therefore formed and permits a reliable counterforce against the prestress in the Z direction due, for example, to the seal pressure. A sudden change in load can therefore be prevented. During the closing of the cover, it is therefore additionally possible by means of the first slotted link to exert a force on the lever counter to the Z direction such that the cover can also be reliably moved into the closed position counter to the seal.

According to embodiments, the second slotted link has a profile which, rearward in the vehicle longitudinal direction, first of all runs in the same direction as the vehicle longitudinal direction and then obliquely with respect to the vehicle longitudinal direction. The second slotted link together with the second guide element permits locking along the vehicle longitudinal direction of the raising lever when the cover is open.

According to one embodiment, the third slotted link has a profile which runs in the same direction as the vehicle longitudinal direction. The third slotted link permits a movement of the raising lever along the guide rail during the pivoting. In particular, the third slotted link has a rear stop in the vehicle longitudinal direction. The rear stop limits a movement of the third guide element in the vehicle longitudinal direction. A limited path for a translatory displacement of the third guide element is therefore defined.

The raising lever does not move together with the cover into the open position. The cover is displaceable relative to the raising lever after the raising lever has been pivoted out. The raising lever is in particular moved along the guide rail only during the pivoting of the cover rear edge for the ventilation position or out of the ventilation position into the closed position. From the ventilation position to the open position or from the open position to the ventilation position, the raising lever is held in a fixed position relative to the guide rail and the cover is moved relative to the raising lever and the guide rail.

In particular, during the movement between the open position and the ventilation position, the raising lever is held in a fixed position on the guide rail by the second and the third guide element. The cover is in particular moved in the manner of what is referred to as a spoiler roof.

According to embodiments, the raising lever is coupled pivotably to the cover by means of a coupling element. The raising lever has a first end and an opposite second end. The coupling element is arranged at the first end. The second and the third guide element are arranged at the second end.

According to embodiments, an axis of rotation of the rotary bearing and a longitudinal axis of the first guide element are identical. The raising lever is coupled to the raising rod at the point at which the first guide element is also formed. The raising rod is therefore also guided in the first slotted link. In addition, in particular no slotted track has to be provided at the raising rod.

According to embodiments, the raising rod is pivotable relative to the guide rail. The raising rod at one end, with which it is coupled to the raising lever, follows the movement in the Z direction during the pivoting of the raising lever.

According to further embodiments, the arrangement has an intermediate lever. The intermediate lever is coupled rotatably at one end to the raising rod. The intermediate lever is coupled by an opposite end on the rotary bearing to the raising lever. It is therefore possible not to pivot the raising rod during the movement along the guide rail and to guide same with a slider along the guide rail. The intermediate lever follows the Z movement during the pivoting of the raising lever.

Further advantages, features and developments emerge from the examples below which are explained in conjunction with the figures. Identical, similar and identically acting elements can be provided here with the same reference signs.

DETAILED DESCRIPTION

Figure 1:
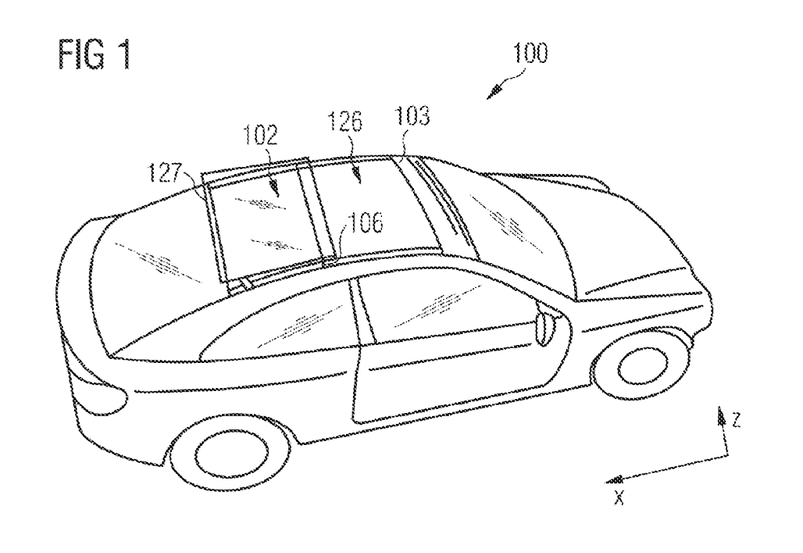
FIG. 1 shows a schematic illustration of a vehicle according to an exemplary embodiment.

FIG. 1 shows a schematic view of a motor vehicle 100. The motor vehicle has a vehicle roof 103. A roof opening 126 is formed in the vehicle roof 103. The roof opening 126 is optionally closable or able to be at least partially opened up by means of a displaceable cover 102. The cover 102 is part of what is referred to as a spoiler roof. The cover 102 has a rear edge 127 in the direction of the vehicle longitudinal direction X. In order to open up the roof opening, starting from the closed position of the cover 102 the rear edge 127 is first of all raised in the Z direction. The cover 102 is subsequently displaced along the X direction. The cover 102 is displaced here relative to a rear raising lever 106, as is explained in more detail below. The rear edge 127 is therefore not directly supported on the vehicle roof 103, in the manner of the spoiler roof, when the cover 102 is completely open. A spoiler roof is described, for example, in DE 10 2014 109 698.

Guide rails 104 (for example FIG. 2) are arranged along the X axis on both sides of the roof opening 126. The arrangement according to the application is explained below with reference to one side of the roof opening 126. The opposite side is constructed in a manner corresponding thereto.

Figure 2:
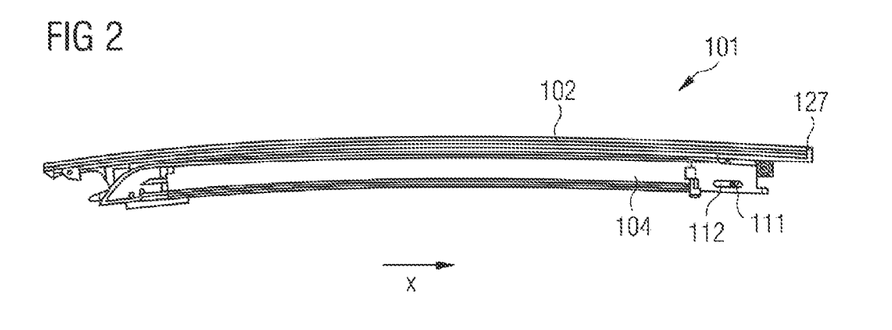
FIGS. 2 and 3 show schematic illustrations of an arrangement according to an exemplary embodiment.
Figure 3:
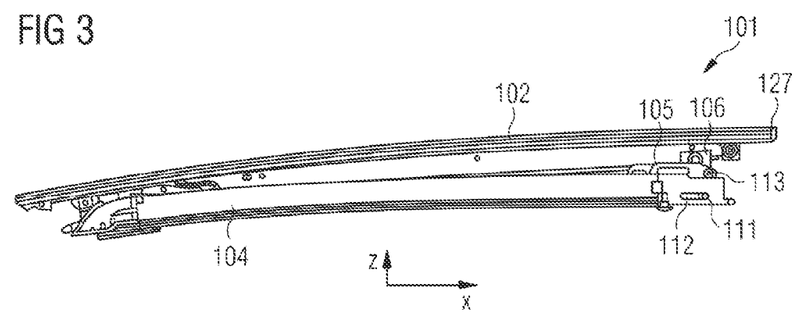

FIGS. 2 and 3 show an arrangement 101 for raising and lowering the rear edge 127 of the cover 102. The guide rail 104 extends along the X direction. A rear raising lever 106 is arranged at the rear end in the X direction. In the operationally ready state in the vehicle 100, the rear end of the guide rail 104 faces the vehicle rear window and faces away from the windshield.

The raising lever 106 is connected to a raising rod 105. The raising rod 105 is in turn coupled to a drive (not explicitly illustrated). The drive comprises, for example, a carriage which is guided in the guide rail 104 and is displaceable along the X direction relative to the guide rail 104. The carriage is connected, for example, to an electric motor or to another drive by means of a drive cable.

FIG. 2 shows the cover 102 in the closed position. FIG. 3 shows the cover 102 in the ventilation position in which the rear edge 127 has been raised in the Z direction in comparison to the closed position.

The raising of the rear edge 127 will be described below in conjunction with FIGS. 4 to 8. The lowering of the rear edge 127 in order to close the cover 102 takes place correspondingly in a reverse sequence.

The raising lever 106 has a first guide element 107, a second guide element 109 and a third guide element 111. The guide elements are, for example, each of bolt-shape design such that they can be guided in slotted links and/or guide tracks.

The first guide element 107 is guided in a first slotted link 108. The first slotted link 108 is formed in a fixed position with respect to the guide rail 104. The first slotted link has a profile which initially runs in a substantially level manner in the X direction and then in a slightly raising manner. Consequently, a distance 114 of the first slotted link from a base 115 of the guide rail 104 increases in the X direction. The third guide element 111 is guided in a third slotted link 112. The third slotted link 112 is likewise formed in a fixed position on the guide rail 104. The third slotted link 112 runs substantially along the X direction. The third slotted link 112 therefore permits a translation of the third guide element 111 within the third slotted link 112. A second slotted link 110, which is also designed as a guide track, serves for guiding the second guide element 109. The second slotted link 110 is also formed in a fixed position on the guide rail 104. The raising rod 105 is connected to the raising lever 106 by means of a rotary bearing 113. In the exemplary embodiment shown, the rotary bearing 113 is formed on the first guide element 107. Consequently, an axis of rotation 120 (FIG. 8) of the rotary bearing 113 and a longitudinal axis 121 (FIG. 8) of the first guide element 107 are substantially congruent. The raising rod 105 is likewise guided at its rear end in the first slotted link 108.

During the displacement of the raising rod 105 in the X direction, the raising lever 106 is likewise first of all displaced in the X direction. The second slotted link 110 and the third slotted link 112 permit this. The first slotted link is also oriented substantially along the X direction in a section which is assigned to said movement sequence, and only in a very slightly raising manner (translation from FIG. 4 to FIG. 5).

Figure 6:
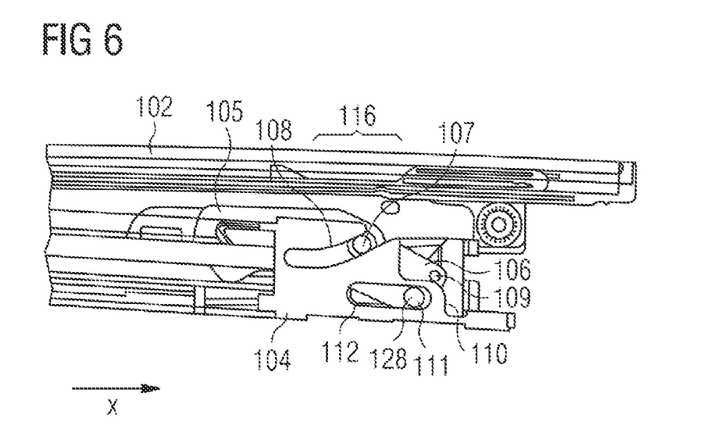
Figure 7:
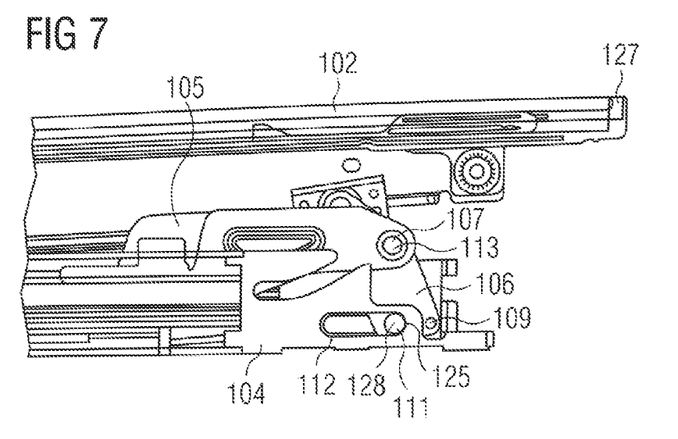

If the raising rod 105 is displaced further in the X direction, as illustrated in FIG. 6, the first guide element 107 is guided in a raising section 116 of the first slotted link 108. The raising lever is therefore already slightly pivoted relative to the guide rail 104. The second slotted link 110 is formed in a corresponding manner. The third slotted link 112 permits a further displacement of the third guide element 111 in the X direction. The raising lever 106 is therefore displaced in the X direction during the pivoting about its axis of rotation 128. The axis of rotation 128 is displaced relative to the guide rail 104 within the third slotted link 112. Owing to the displacement of the raising lever 106 in the X direction and the guiding of the first guide element 107 in the first slotted link 108, a controlled conducting away of the seal pressure, which presses against the cover 102 in the Z direction, is possible.

The first slotted link 108 is in particular of comparatively flat design in the section 116, and therefore the force in the Z direction, which is delivered from the seal to the cover 102, does not result in any blockage of the first guide element 107 in the first slotted link 108. The rotatable connection between the raising rod 105 and the raising lever 106 and the guiding of the first guide element 107 in the positionally fixed, gentle slotted track 108 reduces a sudden change in load triggered by the seal pressure. The raising lever 106 is mounted displaceably along the X direction by means of the third guide element 111 and the third slotted link 112 in order to compensate for Z tolerances at the cover rear edge. The Z tolerances are caused, for example, by the X tolerances at the drive carriage. Alternatively or additionally, more travel along the X direction is permitted for a flatter slotted link 108.

During the further movement sequence (FIG. 7), the third guide element reaches a rear stop 125 of the third slotted link 112. The X movement of the third guide element 111 in the X direction is therefore limited. Owing to the movement of the raising rod 105 in the X direction, the raising lever 106 has been pivoted further about the axis of rotation 128 in order to move the cover rear edge 127 in the Z direction. The second guide element 109 has been transferred into a vertical track section of the second slotted link 110. The raising lever 106 is therefore locked in the illustrated pivoted position along the X direction.

Figure 8:
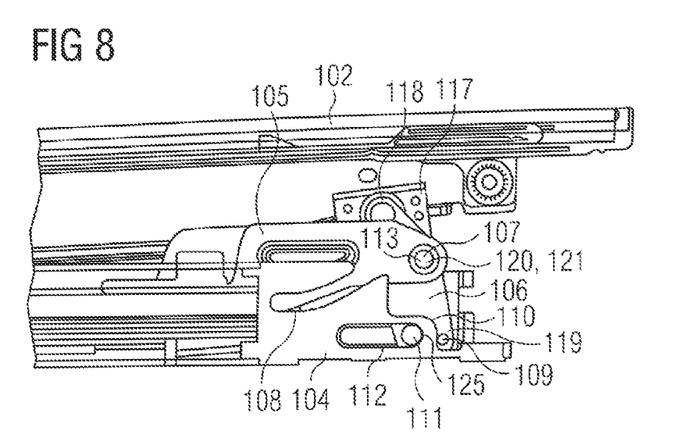

The final ventilation position of the cover 102 is illustrated in FIG. 8. The raising lever 106 has been completely pivoted upward. The raising rod 105 has also been pivoted here in the Z direction relative to the guide rail 104. The raising rod 105 and the raising lever 106 have been pivoted relative to each other about the axis of rotation 120 of the rotary bearing 113. The completely unfolded raising lever 106 is locked along the X direction by means of the second guide element 109 and the third guide element 111. The cover 102 is subsequently displaced further in the X direction relative to the raising lever 106 in order to open up the roof opening 126. For this purpose, the raising lever 106 is coupled to the cover 102, in particular to a cover carrier or cover holder, by means of a coupling element 117. The coupling element 117 permits a relative movement between the cover 102 and the raising lever 106.

The coupling element 117 is arranged at a first end 118 of the raising lever 106. The second guide element 109 and the third guide element 111 are arranged at an opposite second end 119 of the raising lever 106. The rotary bearing 113 and the first guide element 107 are arranged between the coupling element 117 and the second and third guide element 109 and 111. The first guide element 107 is arranged between the first end 118 and the second end 119 in a central region of the raising lever 106.

Figure 4:
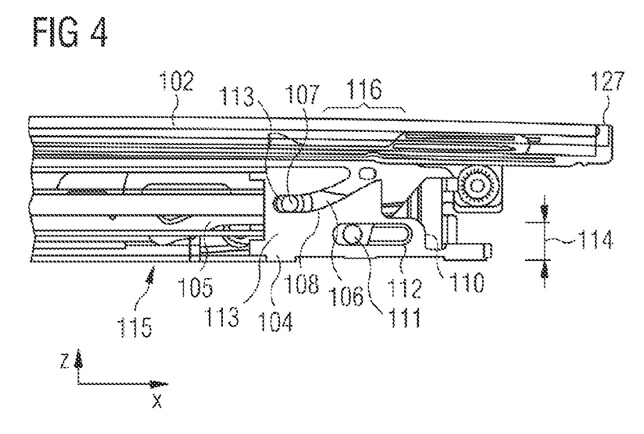
FIGS. 4 to 8 show schematic illustrations of an arrangement according to an exemplary embodiment.
Figure 5:
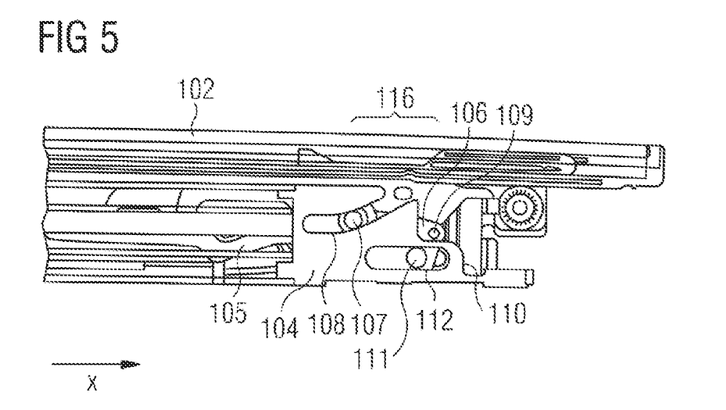

During the closing of the cover from the ventilation position shown in FIG. 8 to the closed position as shown in FIG. 4, the first slotted link 108 together with the first guide element 107 permits an action of a force on the cover 102 counter to the Z direction. The cover 102 can therefore be reliably also completely closed counter to a pressure of the seals.

Figure 9:
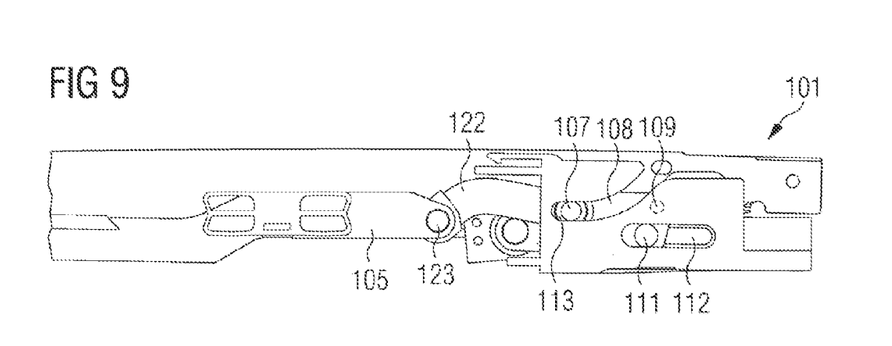
FIGS. 9 and 10 show schematic illustrations of an arrangement according to an exemplary embodiment.
Figure 10:
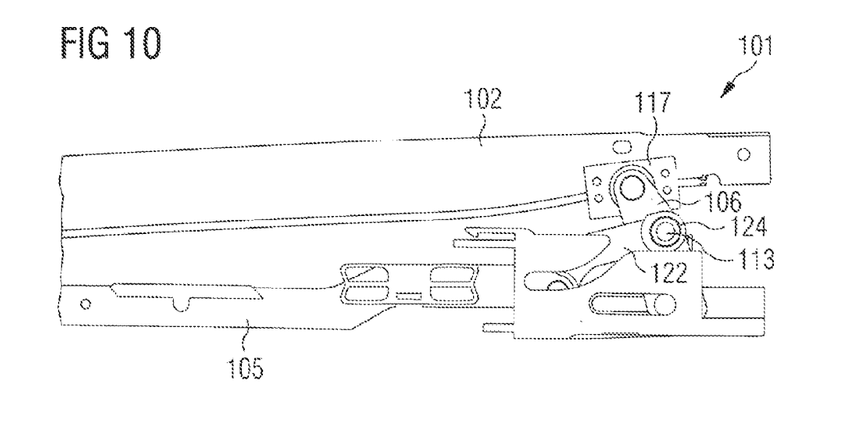

FIGS. 9 and 10 show the arrangement 101 according to a further exemplary embodiment. This corresponds substantially to the previously described exemplary embodiments. In contrast to the previously described exemplary embodiments, the raising lever 106 is connected to the raising rod 105 not directly, but rather by means of an intermediate lever 122. The intermediate lever 122 is coupled pivotably at a first end 123 to the raising rod 105. An opposite second end 124 of the intermediate lever 122 is connected at the rotary bearing 113 and the first guide element 107 to the raising lever 106. It is therefore possible not to pivot the raising rod 105 relative to the guide rail 104 during the movement along the X direction. Only the intermediate lever 122 is pivoted during the raising of the raising lever 106. Otherwise, the guiding of the raising lever 106 in the positionally fixed slotted links 108, 110 and 112 corresponds to that described previously.

In general, the guiding of the raising lever 106 in the three slotted links 108, 110 and 112 permits a rotatable coupling of the raising lever 106 to the raising rod 105 on the rotary bearing 113, either directly, as described in conjunction with FIGS. 2 to 8, or indirectly, as described in conjunction with FIGS. 9 and 10. A slotted track at the raising rod 105 for coupling to the raising lever 106 can therefore be dispensed with. The displacement of the raising lever 106 along the X direction during the pivoting relative to the guide rail 104 permits compensation for tolerances and a flat slope of the slotted link in the section 116.

In addition, because of the coupling of the raising lever 106 to the raising rod 105 by means of the rotary bearing 113, it is possible to produce the guide rail without milling in the rear region. In the pivoted-out position of the raising lever 106, as illustrated, for example, in FIGS. 8 and 10, the raising rod 105 protrudes comparatively little in the X direction. Less construction space is therefore required at the rear edge 107 for the projecting length of the raising rod 105. This permits, for example, a gain in construction space of up to 10 mm. Consequently, a comparatively large opening of the roof opening 126 with the cover 102 completely open is possible.

By means of the fixed connection of the raising rod 105 to the raising lever 106 and the guiding in the first slotted link 108, a sudden change in load during the pivoting out of the raising lever 106 is avoided. In addition, guiding of the raising rod 105 in the Y direction is possible. Additional brake elements, such as a rubber brake, for avoiding the change in load can be dispensed with. In addition, a separate raising slotted link for the raising rod and rail milling operations for this purpose can be dispensed with. A simpler and more reliable operation of the arrangement 101 is therefore possible.

The invention claimed is:

1. An arrangement with a cover for a vehicle roof, having:
   a guide rail which extends along a vehicle longitudinal direction (x), a raising rod which is displaceable along the vehicle longitudinal direction (x) relative to the guide rail, a rear raising lever with respect to the vehicle longitudinal direction (X), which is coupled pivotably to the cover, and which is guided with a first guide element in a first slotted link which is fixed in position with respect to the guide rail, is guided with a second guide element in a second slotted link which is fixed in position with respect to the guide rail, is guided with a third guide element in a third slotted link which is fixed in position with respect to the guide rail, and is directly coupled to the raising rod by means of a rotary bearing.

2. The arrangement according to claim 1, in which the first slotted link has a profile in which a distance between the first slotted link and a base of the guide rail increases rearward in the vehicle longitudinal direction (x) in a section.

3. The arrangement according to claim 1, in which the second slotted link has a profile which, rearward in the vehicle longitudinal direction (x), first of all runs in the same direction as the vehicle longitudinal direction (X) and then obliquely with respect to the vehicle longitudinal direction (X).

4. The arrangement according to claim 1, in which the third slotted link has a profile which runs in the same direction as the vehicle longitudinal direction (X).

5. The arrangement according to claim 1, in which the raising lever is coupled pivotably to the cover by means of a coupling element, the raising lever has a first end and an opposite second end, wherein the coupling element is arranged at the first end, and the second guide element and the third guide element are arranged at the second end.

6. An arrangement with a cover for a vehicle roof, having:
a guide rail which extends along a vehicle longitudinal direction (x),
a raising rod which is displaceable along the vehicle longitudinal direction (x) relative to the guide rail,
a rear raising lever with respect to the vehicle longitudinal direction (X), which is coupled pivotably to the cover, and which
is guided with a first guide element in a first slotted link which is fixed in position with respect to the guide rail,
is guided with a second guide element in a second slotted link which is fixed in position with respect to the guide rail,
is guided with a third guide element in a third slotted link which is fixed in position with respect to the guide rail,
is coupled to the raising rod by means of a rotary bearing, and
in which an axis of rotation of the rotary bearing and a longitudinal axis of the first guide element are identical.

7. The arrangement according to claim 1, in which the raising rod is guided in the first slotted link by means of the first guide element.

8. The arrangement according to claim 1, in which the raising rod is pivotable relative to the guide rail.

9. The arrangement according to claim 1, in which the first guide element, the second guide element and the third guide element are each of bolt-shaped design.

10. The arrangement according to claim 1, in which the third guide element and the third slotted link are designed in such a manner that the raising lever is pivotable relative to the guide rail and in the process is displaceable along the vehicle longitudinal direction (X).

11. An arrangement with a cover for a vehicle roof, having:
a guide rail which extends along a vehicle longitudinal direction (x),
a raising rod which is displaceable along the vehicle longitudinal direction (x) relative to the guide rail,
a rear raising lever with respect to the vehicle longitudinal direction (X), which is coupled pivotably to the cover, and which
is guided with a first guide element in a first slotted link which is fixed in position with respect to the guide rail,
is guided with a second guide element in a second slotted link which is fixed in position with respect to the guide rail,
is guided with a third guide element in a third slotted link which is fixed in position with respect to the guide rail,
is coupled to the raising rod by means of a rotary bearing, and
having an intermediate lever which is coupled rotatably at one end to the raising rod and is coupled at an opposite end on the rotary bearing to the raising lever.

12. The arrangement according to claim 1, in which the third slotted link has a rear stop for the third guide element in order to limit a movement of the third guide element in the vehicle longitudinal direction (x).

13. The arrangement according to claim 5, in which the cover is displaceable along the vehicle longitudinal direction (X) relative to the raising lever via the coupling element.

* * * * *